(12) United States Patent
Lindskog

(10) Patent No.: US 6,425,754 B1
(45) Date of Patent: Jul. 30, 2002

(54) METHOD OF PURIFYING WASTE GASES, AND A GAS BURNER

(75) Inventor: Nils Lindskog, Hallstahammar (SE)

(73) Assignee: Kanthal AB, Hallstahammar (SE)

( * ) Notice: Subject to any disclaimer, the term of this patent is extended or adjusted under 35 U.S.C. 154(b) by 0 days.

(21) Appl. No.: 09/529,858

(22) PCT Filed: Sep. 29, 1998

(86) PCT No.: PCT/SE98/01732
§ 371 (c)(1),
(2), (4) Date: Apr. 19, 2000

(87) PCT Pub. No.: WO99/20375
PCT Pub. Date: Apr. 29, 1999

(30) Foreign Application Priority Data

Feb. 18, 2000 (SE) ............................................... 9800473
Apr. 19, 2000 (SE) ............................................... 9703819

(51) Int. Cl.$^7$ ............................................... F23D 14/00
(52) U.S. Cl. ............................... 431/5; 431/7; 431/170; 126/91 A; 422/190
(58) Field of Search ................................ 431/7, 5, 170, 431/328, 329, 172, 173, 10, 12; 422/171, 174, 172, 190, 194, 199; 126/91 A

(56) References Cited

U.S. PATENT DOCUMENTS 4,375,949 A * 3/1983 Salooga ........................ 431/7
4,459,126 A * 7/1984 Krill et al. ..................... 431/7

FOREIGN PATENT DOCUMENTS

| DE | 33 37 902 | 5/1985 |
| EP | 0 555 936 | 8/1993 |
| EP | 0 701 858 | 3/1996 |
| EP | 0 716 263 | 6/1996 |
| WO | WO 92/09848 | 6/1992 |

* cited by examiner

*Primary Examiner*—James C. Yeung
(74) *Attorney, Agent, or Firm*—Alfred J. Mangels

(57) ABSTRACT

A method of cleansing nitrogen oxide ($NO_x$), hydrocarbon (HC) and carbon monoxide (CO) from waste gases, such as the waste gases or exhaust gases originating from burners and internal combustion engines. The waste gases, or exhaust gases, are passed through a catalyst for catalytic cleansing of the gases. The air-fuel ratio, or the lambda value (L), is reduced to a level below L=1. The gases are passed through a first catalyst and then through a second catalyst, to bring the CO-content of the gas in the first catalyst to a sufficiently high level and to reduce $NO_x$ to $N_2$ to an extent such as to bring the $NO_x$ content down to a predetermined level. Sufficient oxygen ($O_2$) is delivered to the gases at a point between the first and second catalysts to oxidize both CO and HC to $CO_2$ and $H_2O$ to such an extent as to reduce the CO-content of the gas to a predetermined level. A gas burner to carry out the method is also disclosed.

16 Claims, 4 Drawing Sheets

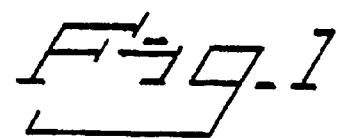
Fig. 1
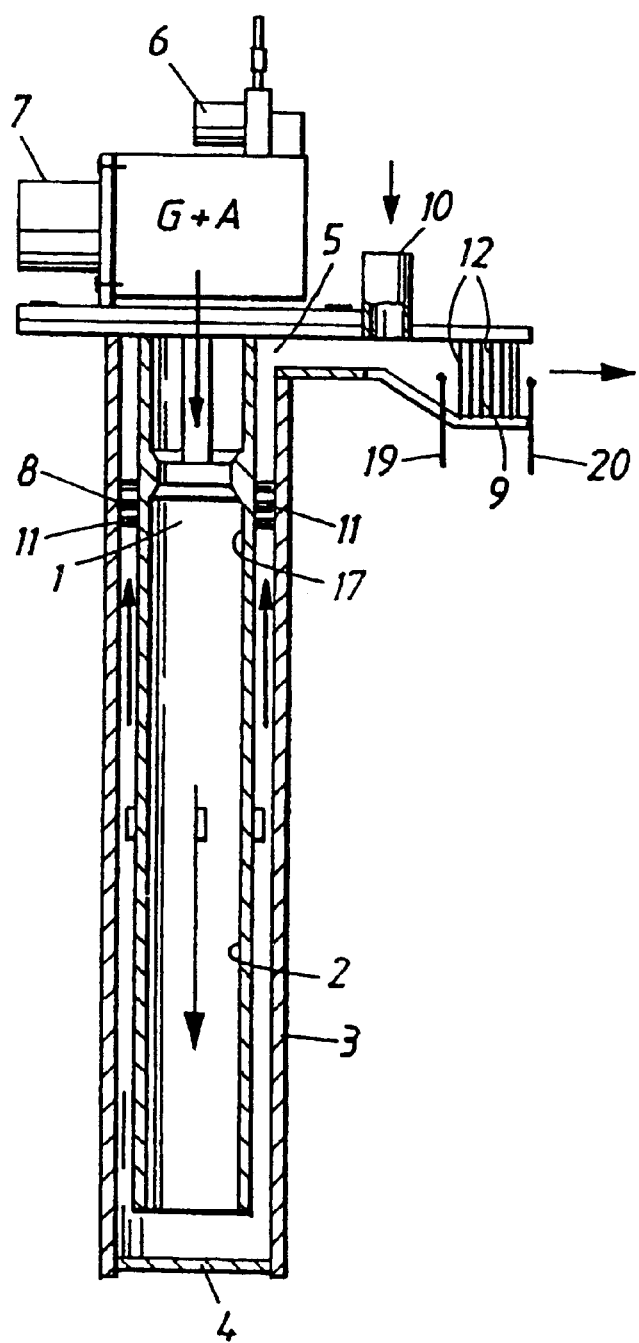

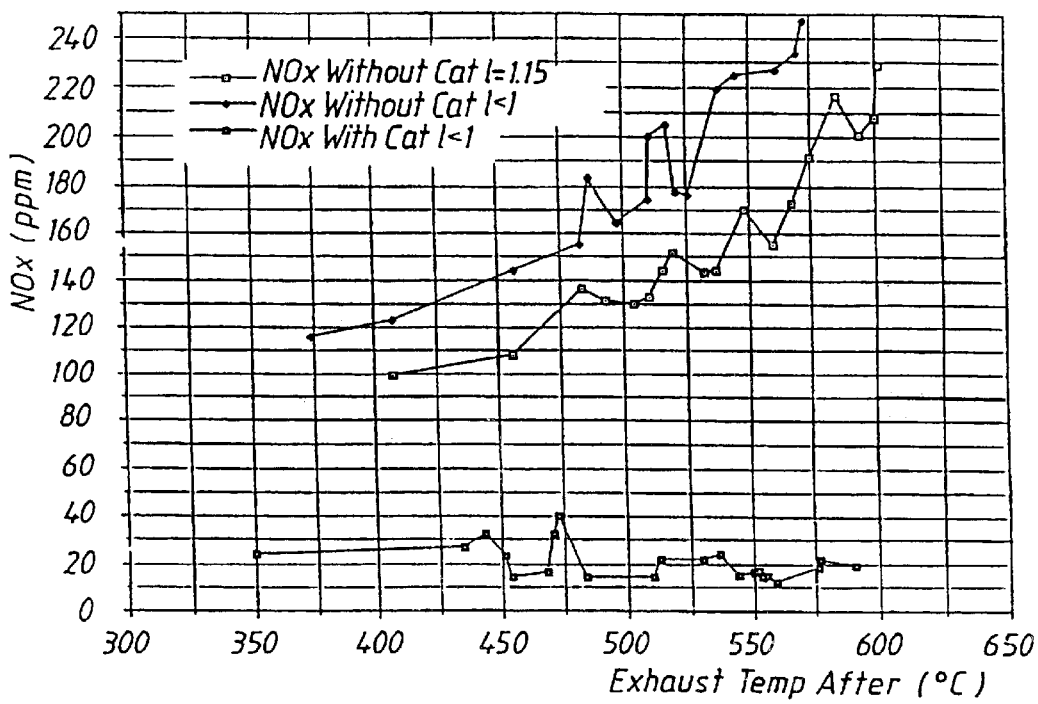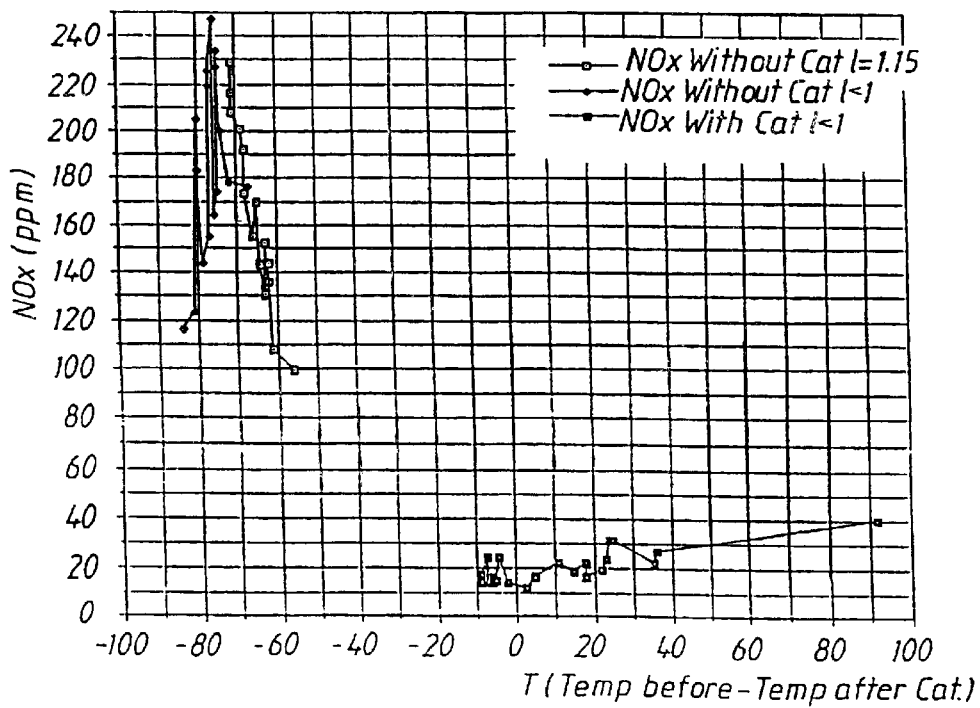

METHOD OF PURIFYING WASTE GASES, AND A GAS BURNER

BACKGROUND OF THE INVENTION

1. Field of the Invention

The present invention relates to a method of purifying waste gases, and also to a gas burner.

More specifically, the invention relates to a method of purifying waste gases that originate from a gas burner or some other combustion source, such as oil-fired burners or the exhaust gases from internal combustion engines. The invention also relates to a gas burner in which the method is applied.

2. Description of the Related Art

It is usual to heat industrial furnaces with gas burners. A normal fuel in this respect is natural gas, although other gases such as propane, butane and bottled gas can be used.

In the case of one efficient gas burner, the burner is of the kind in which the burner head is placed on one end of an inner tube around which there is placed an outer, protective tube which is closed at the bottom. The gases or fumes from the burner chamber pass inside the inner tube and down towards the bottom of the outer tube and flow from there in an opposite direction between the outer tube and the inner tube and thereafter into an exhaust passageway that leads to the surroundings. Heat is delivered by the protective tube to a furnace space, this heat comprising 30% convection heat and 70% radiation heat.

Another similar type of burner also includes an inner tube on which there is placed an outer protective tube. In this case, however, the bottom of the protective tube is not closed. The protective tube has an arcuate shape, e.g. a U-shape, with one free end of the protective tube connected to an exhaust passageway. The inner tube with the burner head is straight and is thus located within the straight part of the protective tube.

Such gas burners deliver high concentrations of hydrocarbons (HC) and nitrogen compounds ($NO_x$).

It would be desirable to be able to increase the temperature of the outer tube to about 1155–1200° C., so as to enhance the burner power concentration. This can be achieved by making the outer tube from a high temperature material, such as silicon carbide (SiC) or from a material in accordance with Advanced Powder Metallurgy (APM), such material containing about 73% Fe, 22% Cr and 5% Al. The powder is extruded in a tubular form.

However, $NO_x$ concentrations increase significantly in waste gases at such high temperatures.

It is known to purify the gases originating from gas burners catalytically in a laboratory environment. The gases are caused to pass through a three-way catalyst that includes ceramic monolith. The $NO_x$ concentrations are herewith reduced by bringing the lambda value (L) to beneath L=1. However, this results in a significant increase in the CO-content of the gas instead.

One problem encountered at high temperatures is that the catalyst is subjected to high thermal stresses, which are liable to destroy a conventional catalyst that includes a ceramic monolith unless the catalyst is cooled.

The present invention solves these problems and enables much lower concentrations of CO, $NO_x$ and HC to be achieved than those achieved with conventional catalytic purification.

This enables a gas burner to operate at higher temperatures without increasing the load on the environment. Contrary to increasing the load on the environment, the concentrations of said substances will be significantly lower at high temperatures than the concentrations obtained with a conventional burner at typically lower temperatures.

A significant advantage afforded by the present invention is that it can be applied in a corresponding manner to lower the concentrations of HC, CO and $NO_x$ in the exhaust gases of internal combustion engines, such as automobile engines.

SUMMARY OF THE INVENTION

The present invention thus relates to a method of cleansing from waste gases, or from exhaust gases that originate from burners and internal combustion engines, their nitrogen oxide ($NO_x$), hydrocarbon (HC) and carbon monoxide (CO) contents. The waste gases, or exhaust gases, are led through a catalyst for catalytic cleansing of the gases. The method includes lowering the lambda value (L) to a level beneath L=1. The gases are led through a first catalyst and then through a second catalyst. The CO-content of the gas in the first catalyst is brought to a sufficiently high level to reduce $NO_x$ to $N_2$ to an extent such as to bring said $NO_x$ content to a predetermined $NO_x$ level. Sufficient oxygen ($O_2$) is delivered to the gas between the first and the second catalyst to oxidize both CO and HC to $CO_2$ and $H_2O$ to an extent such as to reduce the CO-content of the gas to a predetermined HC level.

The invention also relates to a gas burner that includes a catalytic gas purification or cleansing facility of the aforesaid kind.

BRIEF DESCRIPTION OF THE DRAWINGS

The present invention will now be described in more detail with reference to exemplifying embodiments of the invention and also with reference to the accompanying drawings, in which FIG. 1 is a schematic cross-sectional view of a gas burner in accordance with the invention;

FIG. 4 is a diagram showing $NO_x$ concentration as a function of waste gas temperature, with and without a catalyst;

FIG. 5 is a diagram showing $NO_x$ concentration as a function of temperature difference across a catalyst;

DESCRIPTION OF THE PREFERRED EMBODIMENTS

Figure 2:
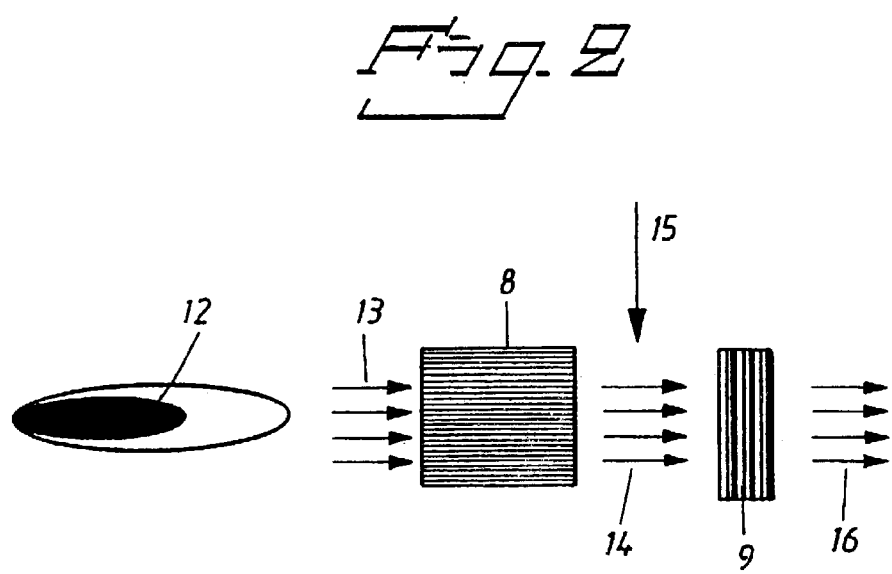
FIG. 2 is an illustration treatment of the waste or exhaust gas.

FIG. 1 illustrates a known type of gas burner for heating furnaces. The gas burner is of the kind where the burner head 1 is placed in one end of an inner tube 2 that is housed in an outer protective tube 3. The bottom 4 of the protective tube 3 is closed. This means that the gases from the burner head will pass down within the inner tube 2 towards the bottom 4 of the outer tube 3, where the gases turn and flow between the outer tube and inner tube in the opposite direction and thereafter enter a waste-gas passageway 5 leading to the surroundings.

The invention is not restricted to any particular gas burner, or other burner. It may equally as well be utilized with reference to the aforesaid type of burner that includes an inner tube which is housed in an outer protective tube whose bottom is not closed but where the protective tube extends in an arc (not shown) with its free end connected to an exhaust gas passageway.

A recuperator 17 is comprised of that part of the inner tube 2 that surrounds the burner head. Alternatively, a recuperator may comprise a separate tube that surrounds the burner head and where a separate inner tube (not shown) is provided in the extension of said separate tube. The separate tube and the separate inner tube are thus axially in line with one another. The separate inner tube commences at the open end of the separate tube.

Gaseous fuel is delivered through an inlet 6 and air is supplied through an inlet 7.

According to the invention, two catalysts 8, 9 are placed one after the other in the flow direction. When the concentration of carbon monoxide in the exhaust gas, or waste gas, is sufficiently high, the first catalyst 8 functions to reduce $NO_x$ to $N_2$ to an extent in which the $NO_x$ content of the gas is brought down to a predetermined $NO_x$ level. An oxygen inlet 10 is provided between the first and the second catalysts 8 and 9. When oxygen is delivered through the inlet 10, the second catalyst functions to oxidize carbon monoxide CO and hydrogen chloride HC is the exhaust or waste gas to carbon dioxide $CO_2$ and water $H_2O$ to an extent such as to reduce the carbon monoxide content of the gas to a predetermined CO level. The oxygen delivered is preferably in the form of air.

According to the present invention, the lambda value (L) is brought to a level beneath a value L=1. The exhaust gas, or waste gas, is thus conducted through the first catalyst 8 and then through the second catalyst 9. As a result of the sub-stoichiometric lambda value, the CO-concentration of the gas within the first catalyst will be sufficiently high for the reduction of $NO_x$ to $N_2$ to an extent such as to reduce the $NO_x$ concentration to a predetermined $NO_x$ value. The $NO_x$-reducing reaction can be written as $NO_x+CO \rightarrow \frac{1}{2}N_2 + CO_2$. An increase in the CO-content of the exhaust gas will drive this reaction further to the right.

The exhaust gas exiting from the first catalyst 8 contains essentially carbon monoxide (CO) and hydrocarbons (HC).

According to the invention, there is introduced between the first catalyst 8 and the second catalyst 9 sufficient oxygen to oxidize both carbon monoxide and hydrocarbons to carbon dioxide ($CO_2$) and water ($H_2O$) to an extent at which the carbon monoxide content of the gas is reduced to a predetermined CO value. The oxygen is preferably delivered by causing air to flow in through the inlet 10. Those reactions that take place in the second catalyst 9 can be written as $CO + \frac{1}{2}O_2 \rightarrow CO_2$ and $H_nC_m + (m+n/2)O_2 \rightarrow mCO_2 + n/2\,H_2O$. These reactions can be driven very far to the right by supplying sufficient oxygen through the inlet 10.

Carbon monoxide thus acts as the fuel for reducing the nitrogen oxide ($NO_x$). Tests have shown that the CO-content of the gas upstream of the first catalyst should be sufficiently high for the CO-content downstream of said first catalyst to be of the order of about 5000 ppm. The oxygen content downstream of the first catalyst 8 is thus about 0 ppm.

According to one preferred embodiment, the lambda value is brought to between 0.940 and 0.995. It is preferred to operate at a lambda value of 0.970. This lambda value provides a high carbon monoxide content that is sufficiently high to reduce the $NO_x$-content to very low values in the first catalyst 8.

It is preferred that the lambda value will be such as to cause the $NO_x$-content to be less than from 50 to 100 ppm downstream of the second catalyst. The drawback with a lambda value below L=1 is that not all of the fuel will be utilized.

It is also preferred to introduce oxygen between the first catalyst 8 and the second catalyst 9 in an amount such that the CO-content will be less than 5–20 ppm downstream of the second catalyst 9. The HC-content will herewith also be less than 5–20 ppm.

According to one highly preferred embodiment, one or both catalysts 8, 9 includes a woven, high-temperature filament or wire that is coated with a layer which includes Rhodium, Platinum and/or Palladium as catalyst(s). Such high temperature filaments, or wires, are produced by Kanthal AB, of Halstahammar, Sweden, the assignee of this present patent application, and contain essentially the same constituents as the aforesaid APM material. Thin pleated ribbons of corresponding material may be used instead of nets. Such ribbons are supplied by Sandvik AB, Sweden.

The reference numeral 11 in FIG. 1 designates a ring-shaped net in the first catalyst 8, whereas the reference numeral 12 designates a disc-shaped net in the second catalyst 9. The advantage of such catalysts is that they withstand higher temperatures than ceramic monolithic catalysts. The flow resistance is also lower than that of conventional catalysts.

According to one preferred embodiment of the type of gas burner described above, the first catalyst 8 is placed between the inner tube 2 and the outer tube 3 at the location of the recuperator 12, and the second catalyst 9 is placed in the exhaust gas passageway 5.

FIG. 2 is an illustration which shows the sequence of treatment of the waste or exhaust gas. Shown are the flame 12 in the burner chamber, the exhaust gas flow 13 towards the first catalyst 8, the exhaust gas flow 14 towards the second catalyst 9, and the supply of air 15 via the inlet 10, and the finally cleansed exhaust gas 16.

Figure 3:
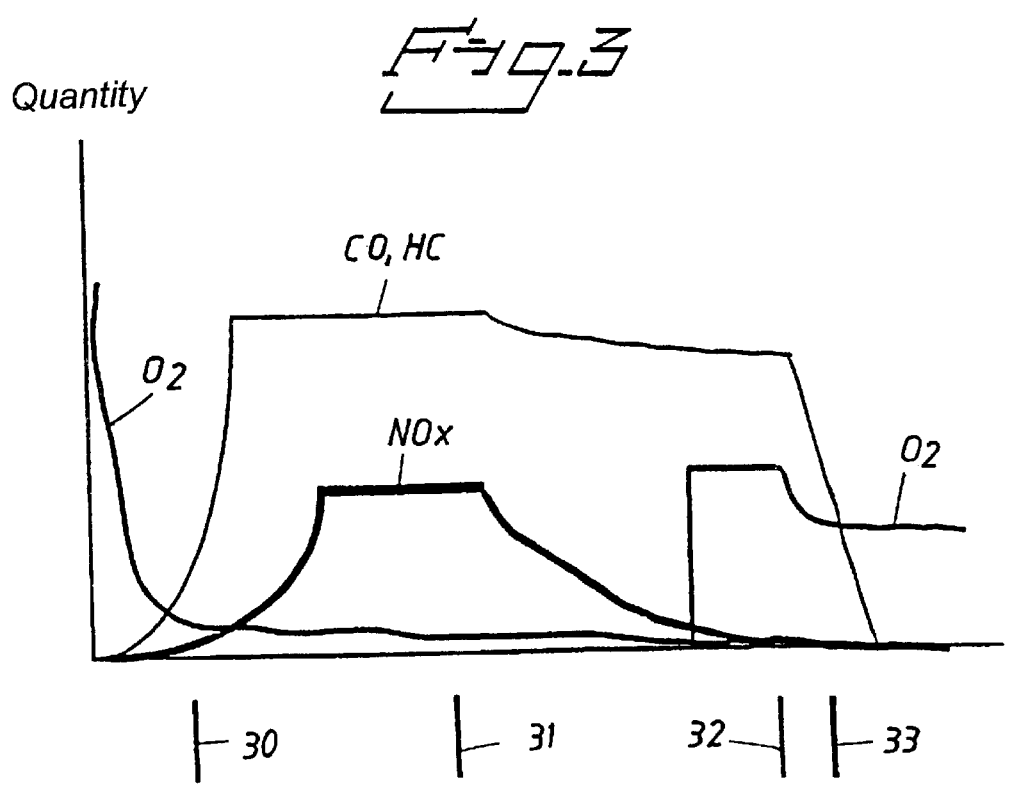
FIG. 3 is a schematic diagram illustrating the sequence relative quantities of $O_2$, HC, CO and $NO_x$ at various stages when the present invention is applied.

FIG. 3 is a diagram which illustrates schematically the course of events in respect of $O_2$, HC, CO and $NO_x$ when the present invention is applied. The Y-axis shows quantity and the X-axis the physical position of the exhaust gas, or waste gas. The upright line 30 designates the position after combustion of the fuel, the upright line 31 designates the point of entry of the exhaust gas into the first catalyst 8, the upright line 32 designates the point of entry of the exhaust gas into the second catalyst 9, and the upright line 33 designates the point of exit of exhaust gas from the second catalyst 9.

Thus, it will be seen from FIG. 3 that the CO-content is high subsequent to combustion and that the $NO_x$-content is reduced in the first catalyst while the CO-content and the HC-content are still high. The supply of oxygen results in the oxidation of CO and HC in the second catalyst 9, so that the exhaust gas leaving the system will have a very low HC, CO and $NO_x$ content.

Full scale tests have been carried out with a so-called WS 80 millimeter burner that had an outer tube 3 made of APM material and an outer diameter/inner diameter of 91/78 millimeters. Corresponding dimensions of the inner tube 2 were 64/56 millimeters. The first catalyst 8 included ten nets comprised of high temperature filaments, while the second catalyst 9 included five such nets.

By way of standard values, about 240 liters of combustion air were delivered each minute, while about 30 liters of air were delivered to the inlet 10 per minute. This gave the burner a power of about 10 kW.

It is preferred to supply air at inlet 10 between the two catalysts in an amount corresponding to about 10–20% of the amount of combustion air delivered to the burner.

FIG. 4 illustrates diagrammatically the result obtained with respect to $NO_x$-content versus exhaust gas temperature downstream of the second catalyst, with and without catalysts. The curves show that the highest $NO_x$-contents are obtained without catalysts and with a lambda value below L=1 (see the intermediate curve that includes open squares). A certain reduction in the $NO_x$-content is obtained with a lambda value of L=1.15 (see the intermediate curve that includes open squares with a center dot). When no catalyst is included, the $NO_x$ value increases with exhaust gas temperature.

However, the $NO_x$-content is lowered dramatically when applying the present invention. This is shown by the lowermost curve that includes empty squares, where the lambda value is L=0.950–0.995 and the catalysts 8, 9 are used. As can be seen the $NO_x$ value is about 20 ppm and is relatively independent of exhaust temperature. The CO-content and HC-content were essentially 0 ppm in the aforesaid tests.

FIG. 5 is a diagrammatic illustration of the $NO_x$-content versus the temperature difference of the gas across the second catalyst 9. The temperature is measured with a first thermocouple 19 (see FIG. 1) the inlet to the second catalyst 9, and with a second thermocouple 20 at the second catalyst oulet.

The curves on the left in FIG. 5 show measurement without catalysts at the lambda value L=1.15 and below L=1, respectively. The $NO_x$-content is thus between 100 and 250 ppm. In this case, the HC-content has mean value of 350 ppm.

The reactions that take place in the second catalyst are exothermic on the whole. Large quantities of air are also delivered through the inlet 10. It has been found that the temperature difference over the second catalyst can be used to control the lambda value, by varying the volume of air supplied to the burner. This is because more carbon monoxide is formed at a lower lambda valued, this carbon monoxide being combusted in the second catalyst and resulting in a rise in temperature difference, and vice versa.

It has also been found that the $NO_x$ value is low with a catalyst and is roughly constant within a certain temperature interval, as appears in FIG. 5 at a temperature difference interval of between about −10° C. to 40° C. The $NO_x$ value then increases slightly above a temperature difference interval of about 40° C.

Figure 7:
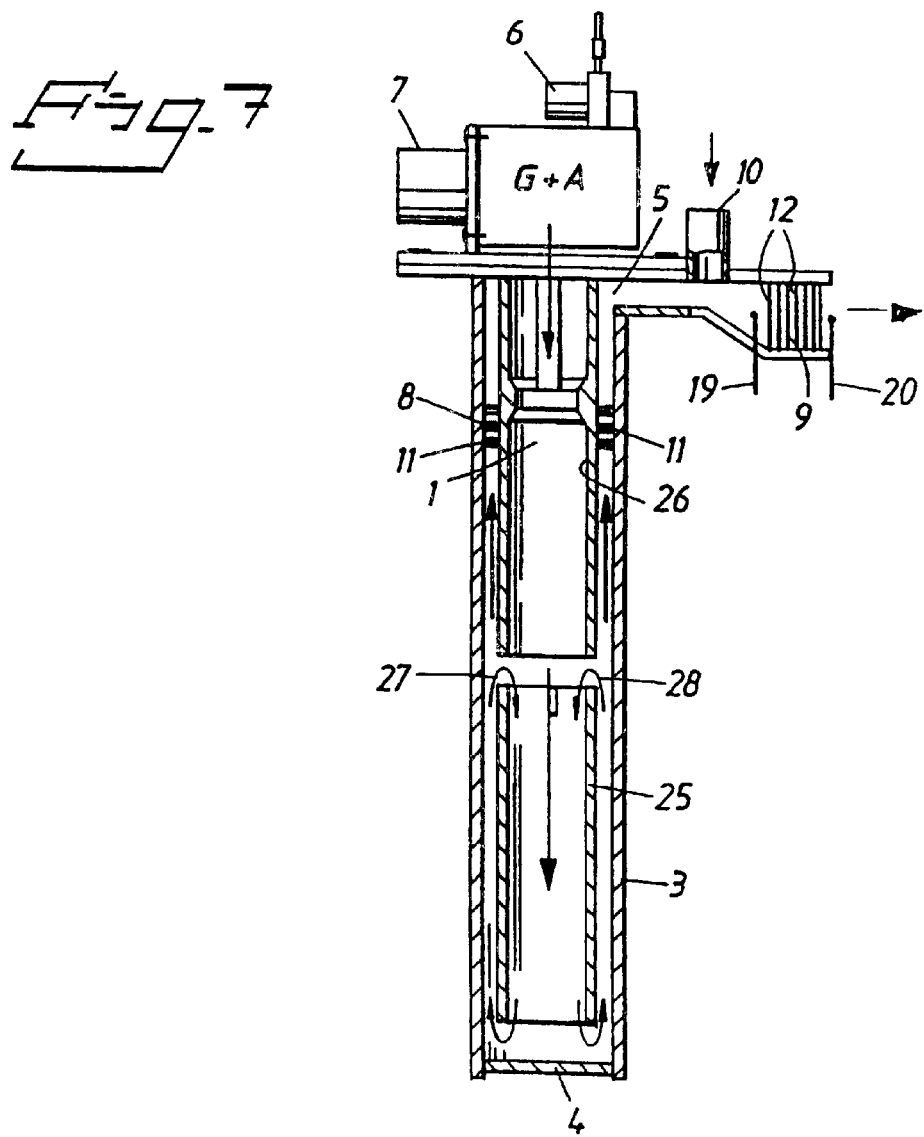
FIG. 7 is a schematic cross-sectional view of a burner according to an alternative embodiment of the invention.

FIG. 7 illustrates an alternative embodiment of the burner shown in FIG. 1. In this alternative embodiment, the inner tube is divided into two inner tubes 25, 26 that lie one after the other in an axial direction. The longitudinal distance between the inner tubes 25, 26 may be at least 5–30 millimetres, or somewhat grater. In this embodiment, the waste gases or exhaust gases are caused to partially re-circulated around the lower inner tube 25, as indicated by the arrows 27, 28.

This results in a lower exhaust gas temperature and a more uniform temperature along the outer tube 3. Complete combustion is also achieved, meaning that a smaller amount of non-combusted CO and HC will enter the exhaust passageway 5. This enables both lower $NO_x$-contents and lower CO-contents to be achieved simultaneously.

It is mentioned in the aforegoing that gaseous fuel is introduced through the inlet 6 and that air is introduced through the inlet 7. It has been found that combustion becomes more complete when the fuel is well mixed with the combustion air. In accordance with one preferred embodiment, a certain amount of air is introduced together with the fuel in the fuel inlet 6, while the remainder of the combustion air is introduced through the inlet 7. This applies to both the burner embodiment of FIG. 1 and the burner embodiment of FIG. 7.

According to one highly preferred embodiment, the temperature difference over the second catalyst 9 is measured and the lambda value is adjusted so that the temperature difference will lie within a predetermined temperature range. The current temperature range may vary with the exhaust flows and with respect to the design of the catalyst and the burner in general. However, by measuring $NO_x$-contents, the person skilled in this art will find no difficulty in determining the temperature interval within which the temperature difference over the second catalyst shall lie in order to obtain a low $NO_x$-content.

Figure 6:
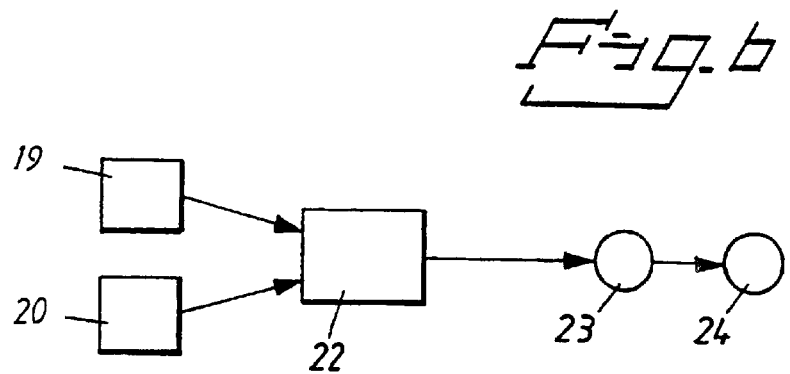
FIG. 6 is a block schematic illustrating a control circuit.

FIG. 6 is a block schematic illustrating a control system for this adjustment. The thermocouples 20, 21 deliver a signal to a microprocessor 22 or the like which is adapted to actuate a stepping motor 23 which, in turn, functions to move a valve 24 with which the air supply to the burner is controlled.

The advantage with this control is that it is much simpler and cheaper than measuring the lambda value during operation with a lambda probe.

The present invention has been described above with reference to cleansing waste gases, or exhaust gases, generated in gas burners. However, the inventive method can be applied equally as well with respect to waste gases from other types of burners and also in respect of purifying exhaust gases from internal combustion engines, such as diesel engines and gasoline engines.

It will be obvious that the present invention solves the problems recited in the introduction.

With regard to specific gasoline (petrol) automobile engines, the first catalyst is placed close to the engine manifold.

The second catalyst is suitably placed at a short distance from the first catalyst, along the exhaust pipe. An air inlet is provided between the catalysts. The skilled person will find no difficulty in dimensioning the catalysts, which suitably include woven high-temperature wire or thin pleated ribbons as before mentioned, or their positioning or the size and design of the air inlet.

It will thus be understood that the invention can be modified and adapted to suit different conditions, such as burner type, engine type, etc., without departing from the concept of the invention, namely to generate through a sub-stochiometric lambda value sufficient carbon monoxide to reduce $NO_x$ in a first catalyst and to oxidize HC and CO in a second catalyst by supplying oxygen thereto, so that the waste gases, or exhaust gases, will thereafter contain essentially $H_2O$, $CO_2$ and $O_2$.

The present invention shall not therefore be considered limited to the aforedescribed exemplifying embodiments thereof, since variations and modifications can be made within the scope of the following claims.

What is claimed is:

1. A method for reducing the level of nitrogen oxide ($NO_x$), hydrocarbon (HC), and carbon monoxide (CO) in waste gases and exhaust gases originating from burners and from internal combustion engines, said method comprising the steps of:

a. premixing a portion of combustion air with fuel to provide an initial air-fuel mixture in which the lambda value of the mixture is below L=1;

b. mixing the initial air-fuel mixture with additional combustion air to provide a final air-fuel mixture for combustion in which the lambda value of the mixture is below L=1 to provide untreated combustion products having CO as a constituent;

c. passing the untreated combustion products over a first catalyst to reduce $NO_x$ in the combustion products to nitrogen ($N_2$) so that the $NO_x$ content of the combustion products that leave the first catalyst is at a predetermined $NO_x$ level;

d. adding oxygen ($O_2$) to the combustion products that leave the first catalyst to oxidize CO and HC components to $CO_2$ and $H_2O$ to reduce the CO level of the combustion products to a predetermined CO level;

e. passing the combustion products over a second catalyst after the addition of $O_2$ downstream of the first catalyst;

f. wherein at least one of the first and second catalysts includes a coating selected from the group consisting of rhodium, platinum, and palladium, and combinations and mixtures thereof.

2. A method according to claim 1, wherein the lambda value of the air-fuel mixture is between about 0.940 and 0.995.

3. A method according to claim 1, wherein the lambda value of the air-fuel mixture is at a level such that the $NO_x$-content downstream of the second catalyst is less than about 50 to 100 ppm.

4. A method according to claim 1, wherein the $O_2$ added between the first catalyst and the second catalyst is a quantity at which the CO-content of the combustion products is less than about 5–20 ppm downstream of the second catalyst.

5. A method according to claim 1, including the steps of: measuring the temperature difference across the second catalyst, and adjusting the lambda value of the air-fuel mixture so that the measured temperature difference across the second catalyst lies within a predetermined temperature difference range.

6. A method according to claim 1, wherein the CO content of the untreated combustion products is at a level sufficient to provide downstream of the first catalyst a CO level of about 5000 ppm.

7. A method according to claim 1, wherein the lambda value is about 0.970.

8. A method according to claim 1, wherein the $O_2$ is provided as air.

9. A method according to claim 1, wherein at least one of the catalysts is in the form of a woven wire net.

10. A method according to claim 1, wherein at least one of the catalysts is in the form of a thin, pleated ribbon.

11. A gas burner for heating furnaces, said burner comprising:

a. a burner head having a fuel inlet and a combustion air inlet and having a burner outlet that opens into an inner protective tube that is housed within an outer protective tube so that combustion products from the burner head first flow along and through the inner tube and then flow to and along and within the outer tube;

b. a gas passageway extending from the outer tube to a gas passageway outlet that opens to the ambient atmosphere;

c. a pair of first and second catalysts spaced from each other and positioned between the burner outlet and the gas passageway outlet and over which combustion products pass as they flow from the burner outlet to the gas passageway outlet, wherein the first catalyst is adapted to reduce $NO_x$ to $N_2$ in the presence of a sufficiently high CO-content of the waste gas to reduce the $NO_x$ content to a predetermined value, and wherein the second catalyst is positioned downstream of the first catalyst;

d. an oxygen inlet positioned between the first catalyst and the second catalyst;

e. wherein the second catalyst is adapted to oxidize CO and HC to $CO_2$ and $H_2O$ in response to the introduction of oxygen through the oxygen inlet to reduce the CO-content of the combustion products to a predetermined value.

12. A gas burner according to claim 11, wherein at least one of the catalysts is in the form of a woven wire net.

13. A gas burner according to claim 11, wherein at least one of the catalysts is in the form of a thin, pleated ribbon.

14. A gas burner according to claim 11, wherein the burner is adapted to operate at a lambda (L) value of the air-fuel mixture within the range of L=0.940–0.995.

15. A gas burner according to claim 11, wherein the first catalyst is positioned between the inner tube and the outer tube adjacent the burner outlet; and the second catalyst is positioned in the gas passageway.

16. A gas burner according to claim 11, wherein the inner tube includes two inner tubes which lie one behind the other in an axial direction, and wherein the longitudinal distance between opposed ends of the inner tubes is at least about 5–30 millimeters.

* * * * *